United States Patent
Jax et al.

(10) Patent No.: US 10,955,287 B2
(45) Date of Patent: Mar. 23, 2021

(54) SYSTEM AND METHOD OF SIGNAL PROCESSING FOR USE IN GUNSHOT DETECTION

(71) Applicant: Trinity Gunshot Alarm System, LLC, Baraboo, WI (US)

(72) Inventors: Stacy Jax, Baraboo, WI (US); Martin Mauersberg, Richmond Hill, GA (US)

(73) Assignee: Trinity Gunshot Alarm System, LLC, Baraboo, WI (US)

( * ) Notice: Subject to any disclaimer, the term of this patent is extended or adjusted under 35 U.S.C. 154(b) by 0 days.

(21) Appl. No.: 16/806,609

(22) Filed: Mar. 2, 2020

(65) Prior Publication Data

US 2020/0278239 A1    Sep. 3, 2020

Related U.S. Application Data

(60) Provisional application No. 62/812,707, filed on Mar. 1, 2019.

(51) Int. Cl.
| | |
|---|---|
| *G01H 3/08* | (2006.01) |
| *G10L 25/18* | (2013.01) |
| *G10L 25/51* | (2013.01) |

(52) U.S. Cl.
CPC ............. *G01H 3/08* (2013.01); *G10L 25/18* (2013.01); *G10L 25/51* (2013.01)

(58) Field of Classification Search
CPC .. G01H 3/00; G01H 3/08; G01H 3/10; G01H 3/12; G01H 3/14; G01H 5/00; G10L 25/18; G10L 25/51; G01N 29/30; G01N 29/42; G01N 29/032; G01N 2291/02491; H04N 11/00; H04R 29/00; H04R 29/001; H04R 29/004; H04R 3/005; H04R 27/00; H04S 7/40; H04S 7/301
USPC ................................. 381/56, 58; 73/645, 646
See application file for complete search history.

(56) References Cited

U.S. PATENT DOCUMENTS

| 5,329,243 | A | 7/1994 | Tay |
|---|---|---|---|
| 6,098,463 | A | 8/2000 | Goldberg |
| 6,621,764 | B1 | 9/2003 | Smith |
| 7,423,934 | B1 | 9/2008 | Uzes |
| 7,586,812 | B2 | 9/2009 | Baxter et al. |
| 7,796,470 | B1 | 9/2010 | Lauder et al. |
| 7,844,248 | B2 | 11/2010 | Sotack |
| 9,240,114 | B2 | 1/2016 | Showen et al. |

(Continued)

*Primary Examiner* — Ahmad F. Matar
*Assistant Examiner* — Sabrina Diaz
(74) *Attorney, Agent, or Firm* — Boyle Fredrickson, S.C.

(57) ABSTRACT

A system and method for detecting the occurrence of a gunshot are provided. The method may include receiving acoustic signals at a microphone indicative of a magnitude of the acoustic signal at a plurality of discrete frequencies, converting the acoustic signals to a digital signal and then employing a Goertzel algorithm based digital signal filter on the digital signal to produce Goertzel magnitudes at the plurality of discrete frequencies. The method subsequently determines if a maximum value of the digital signal is higher than a predefined threshold value. If the threshold value is exceeded, the method predicts if the Goertzel magnitudes at the plurality of discrete frequencies are indicative of a gunshot sound via gradient boosting; and, transmits a signal indicative of a gunshot occurrence after predicting if a possible gunshot event has occurred. A debouncer may also be utilized to suppress duplicative signals.

20 Claims, 7 Drawing Sheets

(56) References Cited

U.S. PATENT DOCUMENTS

| | | | |
|---|---|---|---|
| 9,812,152 B2* | 11/2017 | Christian | G10L 21/14 |
| 9,830,932 B1* | 11/2017 | Gunderson | H04M 1/82 |
| 10,586,109 B1* | 3/2020 | Fowler | G01S 5/18 |
| 10,637,424 B1* | 4/2020 | Johnson | H04R 29/00 |
| 10,657,800 B1* | 5/2020 | Fowler | G01S 3/803 |
| 2009/0058630 A1 | 3/2009 | Friar et al. | |
| 2015/0086028 A1* | 3/2015 | Gaiser | H04R 29/001 |
| | | | 381/59 |
| 2016/0232774 A1 | 8/2016 | Noland et al. | |
| 2017/0328983 A1* | 11/2017 | Volgyesi | G01S 5/28 |
| 2019/0066481 A1* | 2/2019 | Brown | G08B 17/10 |
| 2020/0135224 A1* | 4/2020 | Bromand | G10L 21/0208 |

\* cited by examiner

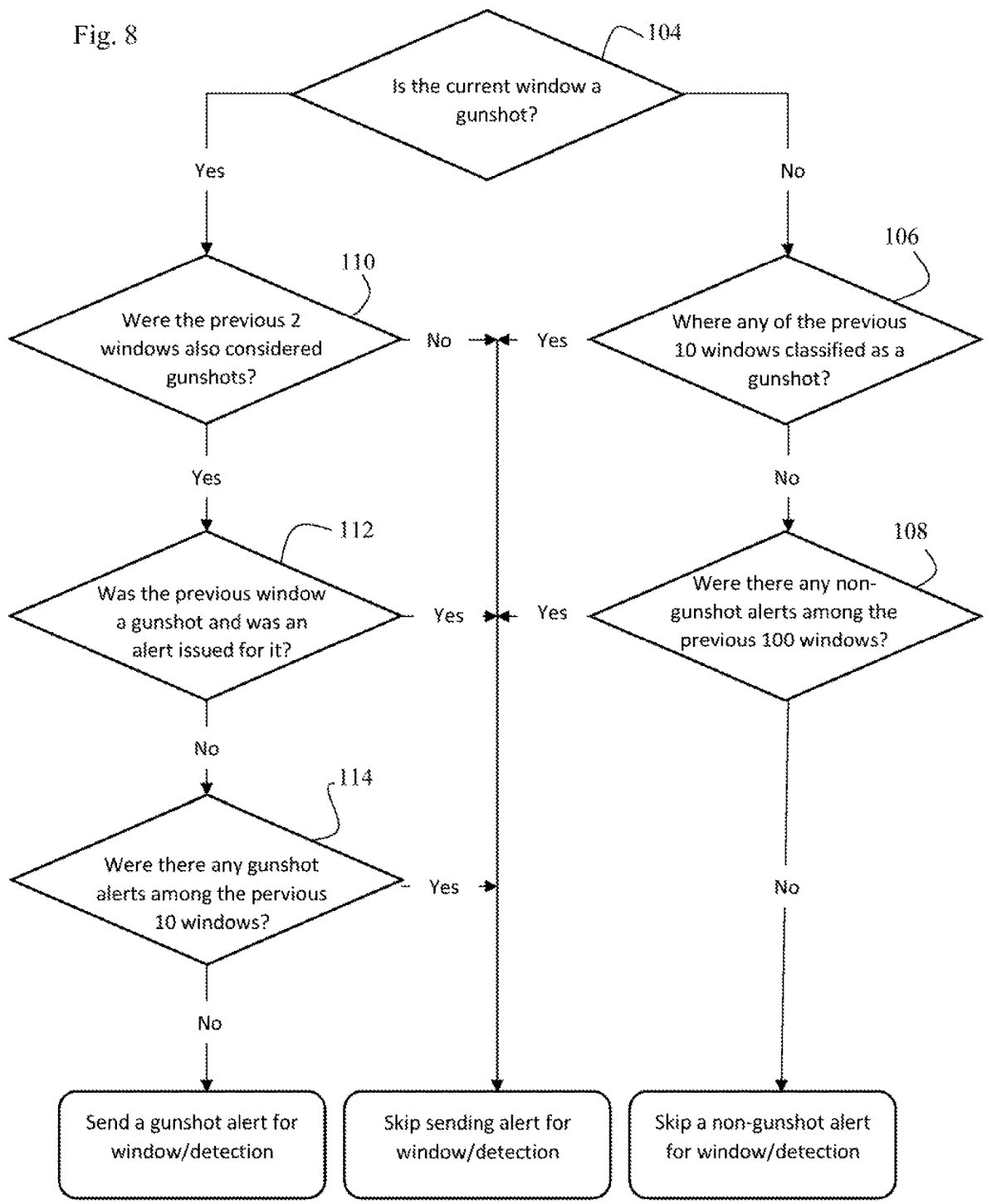

SYSTEM AND METHOD OF SIGNAL PROCESSING FOR USE IN GUNSHOT DETECTION

CROSS-REFERENCE TO RELATED APPLICATIONS

This application claims priority to U.S. provisional application Ser. No. 62/812,707, filed Mar. 1, 2019, the entire contents of which is incorporated herein by reference.

BACKGROUND OF THE INVENTION

The present invention relates to system for the detection of a gunshot and, more specifically, to the system and method of processing a digital signal to identify the gunshot sound and location of origination.

The occurrence of active shooter incidents has risen in recent years. In order to effectively respond to such incidents, it is important that individuals occupying a facility in which a gunshot has occurred, and emergency responders be provided with relevant and accurate information in a timely manner. Quickly providing both a notice that a gunshot has occurred and its relative location to occupants and emergency responders will significantly improve both the ability to eliminate active shooter threats and provide emergency response to those in harm's way.

Accordingly, there remains the need to be able to provide a gunshot detection system that accurately distinguishes the sound of a gunshot from other noise and identifies the location of the gunshot origination.

In one embodiment of the invention a method for detecting the occurrence of a gunshot is provided. The method includes the steps of: receiving acoustic signals at a microphone indicative of a magnitude of the acoustic signal at a plurality of discrete frequencies; converting the acoustic signals to a digital signal and then employing a Goertzel algorithm based digital signal filter on the digital signal to produce Goertzel magnitudes at the plurality of discrete frequencies. The method then determines if a maximum value of the digital signal is higher than a predefined threshold value. If the threshold value is exceeded, the method predicts if the Goertzel magnitudes at the plurality of discrete frequencies are indicative of a gunshot sound via gradient boosting; and, transmits a signal indicative of a gunshot occurrence after predicting if a possible gunshot event has occurred.

In another aspect of the invention, the Goertzel algorithm based digital signal filter produces a tuple of Goertzel magnitudes corresponding to eleven discrete frequencies for each digital signal packet corresponding to a sample duration of 10 milliseconds.

In another aspect of the invention, the plurality of discrete frequencies subject to the Goertzel algorithm based digital signal filter are selected from a group of frequency consisting of: 5, 800, 3800, 4000, 6100, 6200, 6300, 6700, 7200, and 8000 Hz.

In another aspect of the invention, the method also includes the step of retaining a series of ten preceding tuples of Goertzel magnitudes in a circular buffer after the tuples are produced at the Goertzel algorithm based digital signal filter.

In another aspect of the invention, the method also includes the step of transmitting the series of ten preceding tuples of Goertzel magnitudes from the circular buffer to a gradient boosting decision tree in the event that the digital signal of maximum value is higher than a predefined threshold value In another aspect of the invention, the method also includes the step of receiving the positive output at a debouncer and generating a signal indicative of a gunshot occurrence while suppressing duplicative signals.

Further aspects or embodiments of the present invention will become apparent from the ensuing description, which is given by way of example only.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore, non-limiting embodiments illustrated in the drawings accompanying and forming a part of this specification, wherein like reference numerals designate the same elements in the several views, and in which.

Figure 1:
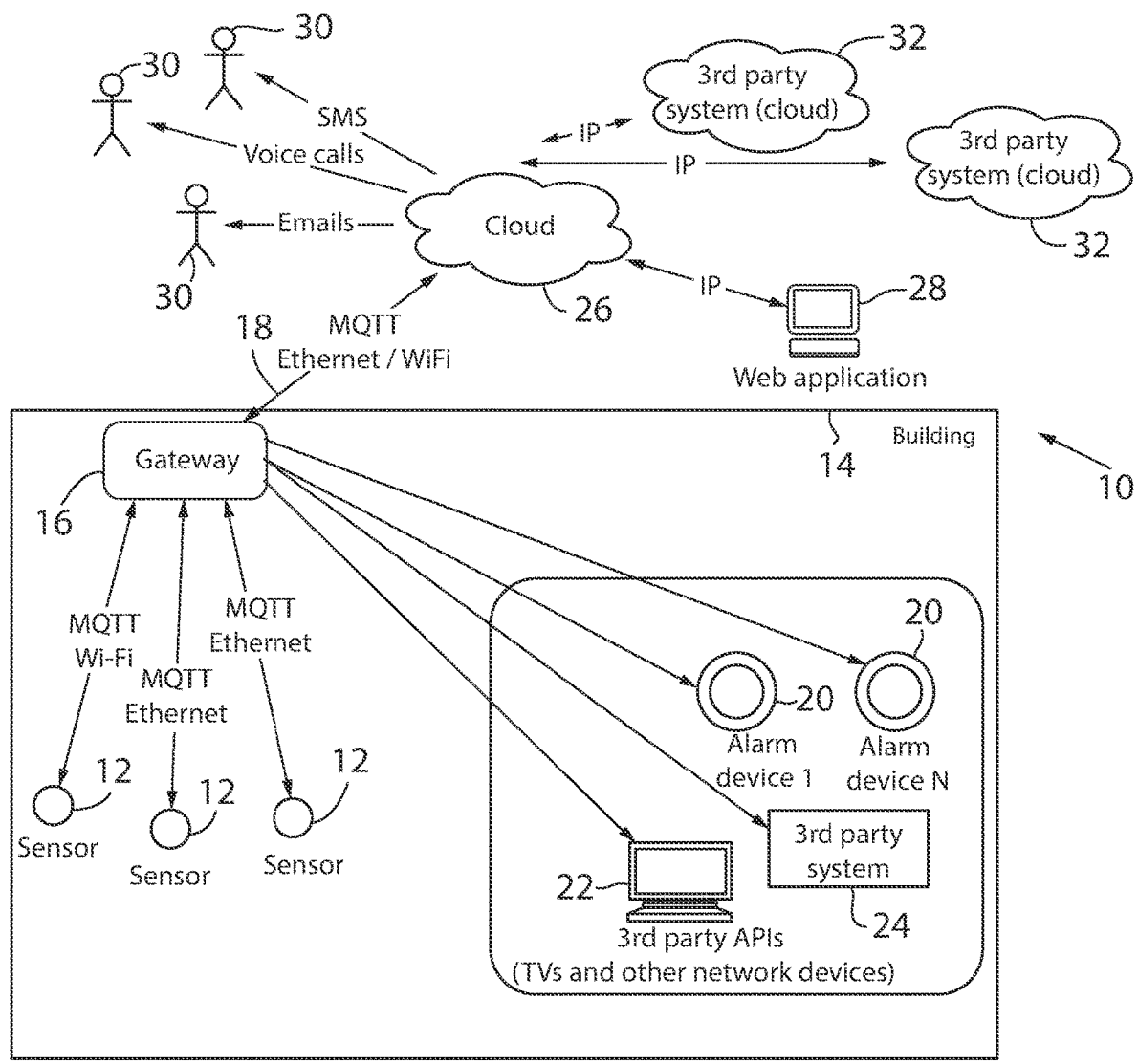
FIG. 1 is a high-level architecture outline for a gunshot detection system in accordance with one embodiment of the present invention.

In describing the embodiments of the invention which are illustrated in the drawings, specific terminology is resorted to for the sake of clarity. However, it is not intended that the invention be limited to the specific terms so selected and it is to be understood that each specific term includes all technical equivalents which operate in a similar manner to accomplish a similar purpose

DETAILED DESCRIPTION

A wide variety of individual components, e.g., sensors and gateways, and gunshot detection algorithms could be used with a gunshot detection system in accordance with the invention as described herein. Hence, while the preferred embodiments of the invention will now be described with reference to a system having at least one sensor that is configured to employ a gunshot detection algorithm to a Goertzel filtered intermediate signal, it should be understood that the invention is in no way so limited to such an algorithm as disclosed, and others may be used with a gunshot detection system in accordance with the invention as described herein.

Referring initially to FIG. 1, a high-level architecture for a gunshot detection system 10 in accordance with one embodiment of the present invention is shown. The gunshot detection system 10 includes a plurality of sensors 12 disposed within a building 14. Each of the sensors 12 comprise a device that is configured to detect and analyze sounds similar to a gunshot sound and send data related to the incident of a gunshot to a cloud computing network as will be described in further detail below. As shown in the representative example of FIG. 1, three (3) sensors 12 are disposed within the building 14, however, it should be understood that the system 10 is not limited to such a number, and that any number of sensors 12 is configured to be present in the system 10 according to the present invention.

Each of the sensors 12 is in communication with a gateway 16, which connects the sensors 12 installed in the building 14 into a network 18. The sensors 12 may preferably communicate with the gateway 16 via a message queuing telemetry transport (MQTT) massaging protocol standard transmitted via Wi-Fi or ethernet, however other signaling protocols are considered well within the scope of the current invention. Upon receiving the signal from the sensors 12 at the gateway 16, the gateway 16 may transmit a response signal to trigger alarm devices 20 and/or interface with additional network linked devices 22 that belong to building's network, such as TVs, or third-party notification systems 24. The alarm devices 20 may provide an audible and/or visible alarm notification upon receiving a signal indicative of a gunshot from the gateway 16.

Additionally, the gateway 16 is in communication with an on-demand computing network, i.e. cloud 26, such as an Amazon Web Services (AWS). The cloud 26 may provide the system 10 with access to data storage, processing, management and Internet of Things (IoT) application and devices, such as a client application, i.e., web-based application 28 connected to the cloud 26 that provide administrative functionality to the users. The cloud 26 may similarly transmit notifications to various individuals 30, such as emergency responders, police, EMTs, etc. via voice-over internet protocol voice call, email messages, and/or short message service (sms). The cloud 26 may also communicate via an internet with one or more other third-party on-demand computing networks, i.e., third-party cloud systems 31 to provide information to indicate the occurrence of a gunshot identified at one or more of the sensors 12 and the location of the gunshot.

Figure 2:
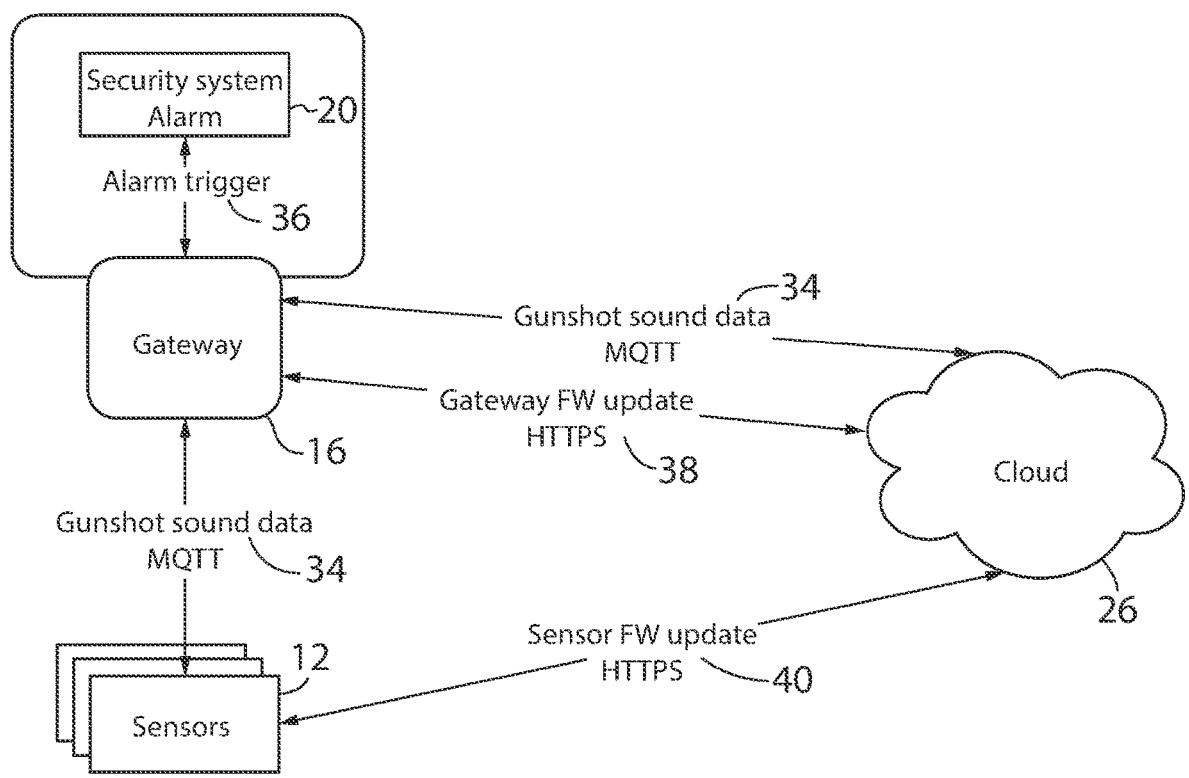
FIG. 2 is a data flow diagram for the gunshot detection system of FIG. 1.

Turning now to FIG. 2, a data flow diagram for the gunshot detection system 10 in accordance with one embodiment of the present invention is shown. As illustrated in FIG. 2 gunshot sound data 34 is transmitted from the one or more sensors 12 to the gateway 16 via MQTT messaging protocol standard. The internet connected gateway 16 then transmits the gunshot sound data 34 to the cloud 26. In addition to transmitting the gunshot sound data 34 to the cloud 26, the gateway 16 may also transmit an alarm trigger signal 36 directly to an alarm 20, as was described above. In one embodiment of the present invention the alarm 20 may be connected to the gateway 16 via a local area network connection, which does not require internet connectivity. Alternatively, the gateway 16 may be in direct connected to the alarm 20 located within the building 14 via a hardwire, i.e., non-wireless connection, or even integrated directly into the alarm 20 device. Still referring to FIG. 2, administrative functionality, such as firmware updates may be provided via the cloud 26 to the system, for example in the form of a gateway update 38 and/or sensor update 40. The updates 38, 40 may be transmitted from the cloud 26 via HTTPS, TCP/IP and/or TLS protocols between the cloud 26 to the sensors 12 or gateway 16. In one embodiment of the present invention, the sensor update 40 may be provided directly to the sensors via direct connection with the cloud 26. Alternatively, the sensor update 40 may be provided from the cloud 26 via the gateway 16.

Figure 3:
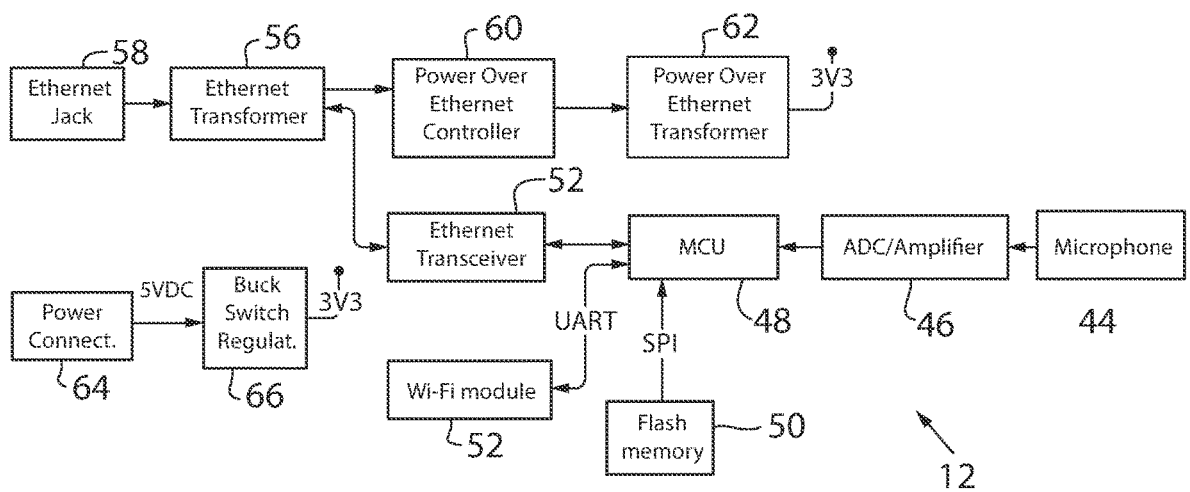
FIG. 3 is a block diagram of a sensor for the gunshot detection system of FIG. 1.

As shown in FIGS. 1 and 2, the system 10 includes one or more sensors 12. Turning now to FIG. 3, a block diagram of one embodiment of a sensor 12 according to the present invention is shown. Accordingly, each sensor 12 may include a microphone 44, an analog to digital converter (ADC) and signal amplifier 46, and a processor or micro control unit (MCU) 48, where the microphone receives sound, i.e., acoustic waves, from the surrounding environment, including applicable acoustic waves formed from the occurrence of a gunshot, as well as other loud sounds, such as a slamming door. The initial sound signal is transmitted from the microphone 44 as an analog signal to the ADC and amplifier 46, which are in electrical communication with the microphone 44. The ADC and amplifier 46 convert the initial sound signal into an amplified digital signal. The amplified digital signal is then transmitted from the ADC and amplifier 46 to the processor 48 via electrical communication. The processor 48 converts the amplified digital signal into a Goertzel magnitude, i.e., intermediate signal, as will be described in further detail below. The processor subsequently applies a downstream algorithm analysis to the intermediate signal in the event that threshold parameters are met, as will also be described in further detail.

Still referring to FIG. 3, the sensor 12 may further comprise a flash memory unit 50 in communication with the processor 48 via a serial peripheral interface (SPI) communication protocol. A Wi-Fi module 52 may also be in communication with the processor 48 for wireless communication between the sensor 12 and the gateway 16 and/or cloud 26, as described above. Communication between the sensor 12 and the gateway 16 and/or cloud 26 may also occur via non-wireless communication, by way of an ethernet transceiver 54, ethernet transformer 56, and ethernet jack 58, as shown in FIG. 3. In such an embodiment, power may be provided to the sensor 12 via ethernet connection, in which the ethernet transformer 56 is in further communication with a power over ethernet controller 60 and transformer 62 to provide a 3.3 volt current to the sensor 12. Alternatively, or in combination with the ethernet power supply, the sensor 12 may include a power connector 64 for receiving a 5 volt direct current from an external AC power supply adapter (not shown) and a buck switch regulator 66 to step down the voltage to 3.3 volts.

In another embodiment of the invention, the sensor 12 may also include a plurality of status indicator lights, such as LEDs (not shown). In one embodiment, the sensor 12 includes five (5) LED lights on the sensor 12 that may indicate the sensor's status selected from: (I) a connection LED that indicates the state of sensor's connection to the power source, IP network and the gateway; (2) a detect LED that indicates whether a gunshot is detected; (3) an error LED that indicates the status of the sensor's ability to detect sounds; (4) an IRQ LED that indicates that the sensor has detected a sound; and, (5) a clip LED that indicates that the sensor has detected a very loud sound, having an amplified digital signal output voltage of greater than 2.2 volts, that is clipped in order to be processed. Variable functionality of the individual LEDs may be indicative of various status conditions within each of the five categories. For example, the connection LED may be variable in color to indicated that: (1) the sensor 12 is connected to the power source, e.g., that the IP connection and gateway connection are not established yet; (2) the sensor 12 is connected to the power source and IP network; or, (3) the sensor 12 is connected to the gateway 16, power source and IP connection. Similarly, the detect LED may change in color or pulse rate to indicated that the sensor 12 processor has confirmed that a sound is a gunshot or alternatively that the sound is not a gunshot.

Figure 4:
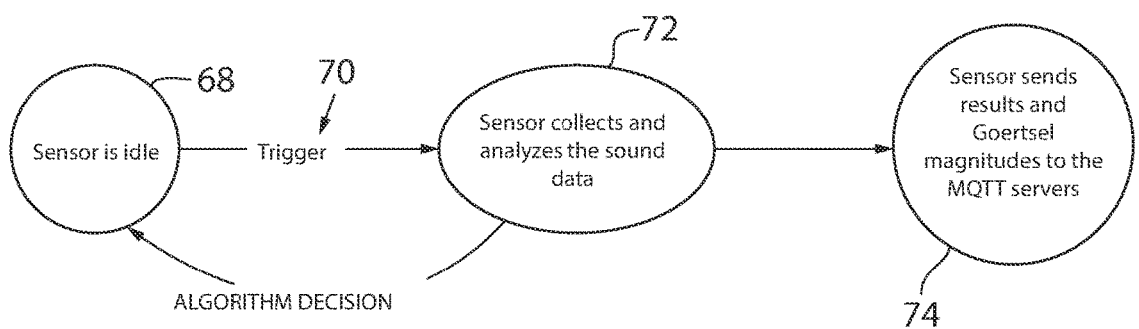
FIG. 4 is a flowchart diagram illustrating the status of the sensor of the gunshot detection system of FIG. 1.

Turning now to FIG. 4, a flow chart of the gunshot detection process overview of a sensors 12 is shown. First, at the initial state 68, the sensor 12 waits in an idle status for an initial trigger sound event 70. After the occurrence of an initial trigger sound event 70 the sensor 12 enters the collection and analysis status, shown at state 72 and begins to collect values from an analog to digital converter (ADC) 46. As a result of the analysis of the sound data at the processor 48 of the sensor 12, the sensor 12 may then send results indicating the presence or absence of a detected gunshot to the gateway 16 and/or cloud 26 as to trigger an alarm response at final state 74.

Figure 5:
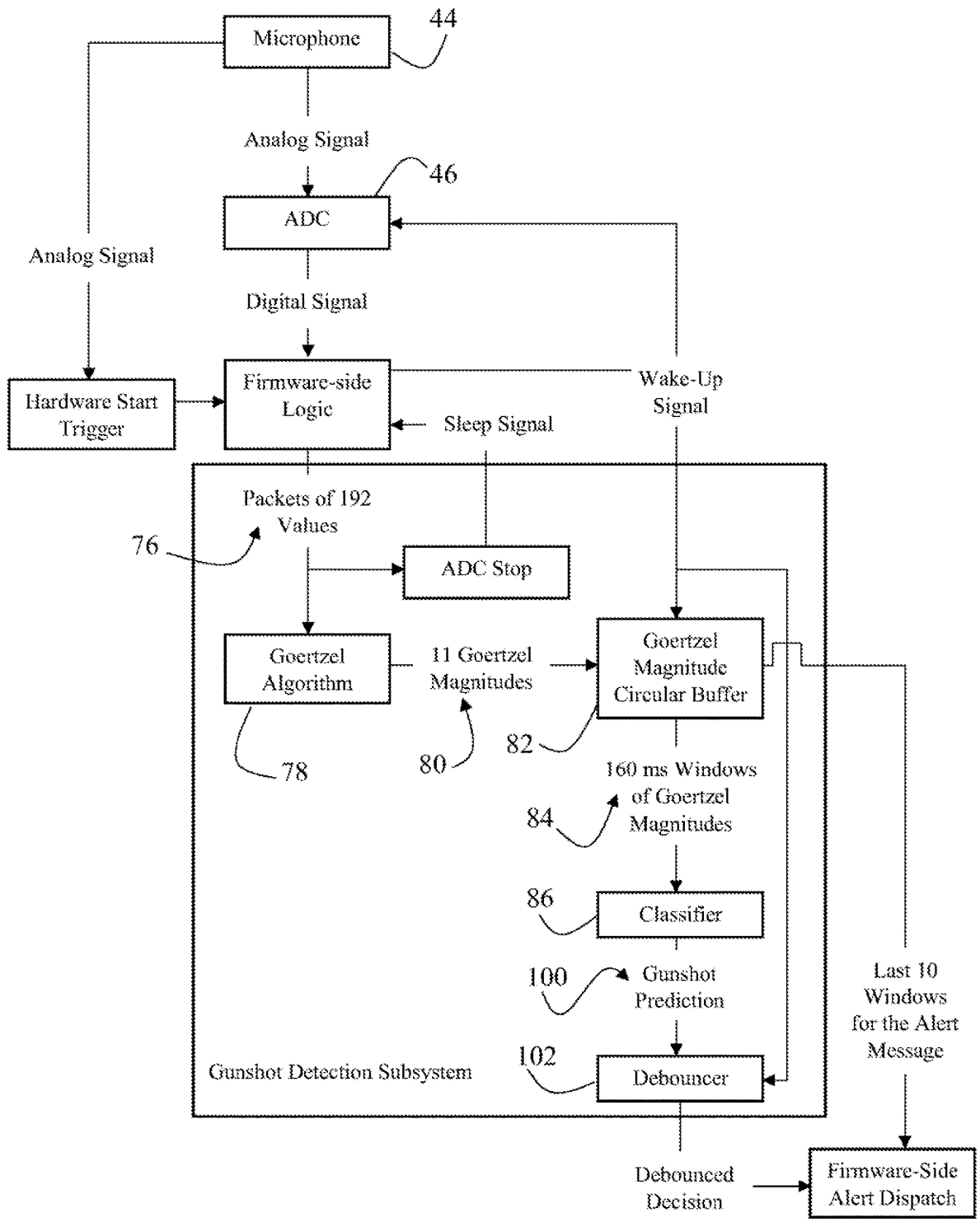
FIG. 5 is a block diagram illustrating one embodiment of sensing a gunshot with a sensor of the gunshot detection system of FIG. 1.

Turning now to FIG. 5, the gunshot detection logic, referenced above, will be described in further detail. As indicated above, the sensor 12 of system 10 begins in the initial state 68 in the absence of an initial trigger sound event 70. Upon sensing such an event 70, the sensor 12 transitions to the collection state 72, where the microphone 44 captures analog sound signals that are transferred to the analog to digital converter (ADC) 46. The ADC 46 generates 19,200 digital sound samples per second, which are then transmitted to the processor 48 in packets 76 of 192 values each, corresponding to a sample duration of 10 milliseconds (ms) per packet 76. The packets 76 are received by the Goertzel algorithm and statistical accumulator box 78 of the processor 48. In one embodiment the sensor processor 48 then applies a Goertzel filter to the 192 ADC signal values in the packet 76, which are transformed into, eleven magnitudes spanning low, medium and high frequencies.

Generally, the Goertzel algorithm based digital signal process at box 78 is applied to filter the amplified digital signal within the packets 76. As opposed to alternative digital signal processing, such as Fourier transform, which decomposes a time-based signal into its various frequencies that results in a data set that contains all represented frequencies of the input signal, the Goertzel algorithm based digital signal process at box 78 focuses on discretely selected one or more frequencies. To this end, the present inventors have identified that there is no spectral gap, i.e., missing sound frequencies in gunshot acoustic waves, as is the case for other sounds such as a piano or human speech. This finding allows for discrete analysis of particular frequencies rather than a broad all-encompassing spectrum of audible frequencies. Namely, in one embodiment, discrete frequencies selected from the low, middle and high-end frequency ranges, that are commonly present in gunshot sounds are analyzed at box 78, thus avoiding extensive and time-consuming calculations over a full spectrum of sound. This reduction in data collection and processing requirements are also significant in reducing the processing and data storage requirements of the gunshot detection system 10 given the limited available memory of the MCU present in the sensor 12. Additionally, focusing on discrete sound frequencies allows the system 10 to avoid inadvertently and/or passively recording unintended sounds, such as personal conversation. In this way, the current system 10 further alleviates privacy concerns that may be prevalent in alternative systems. To this end, the present inventors have identified a solution for analyzing the collected sound at magnitudes of key frequencies over time.

While a gunshot sound covers a wide area of frequencies, the inventors have identified certain key frequencies that exhibit specific behaviors. Accordingly, in one embodiment of the present invention, the system 10 records sound data at eleven frequencies and produces time domains of these eleven frequencies, as will be described in further detail below. To produce the desired result, the system 10 analyzes and produces Goertzel magnitudes for each packet 76 for the eleven selected frequencies. The concatenation of these magnitudes results in a time domain view of the magnitudes of these key frequencies.

The Goertzel algorithm of the sensor 12 operates on an input sequence x[n] in a cascade of two stages with parameter $\omega_0$ providing the frequency to be analyzed, normalized to radians per sample. The first stage calculates an intermediate sequence, s[n]:

$$s[n]=x[n]+2\cos(\omega_0)s[n-1]-s[n-2]$$

The second stage applies the following filter to s[n], producing output sequence y[n]:

$$y[n]=s[n]-e^{-j\omega_0}s[n-1]$$

The first filter stage can be observed to be a second-order IIR filter with a direct-form structure. The second-stage filter can be observed to be a FIR filter, since its calculations do not use any of its past outputs.

In one embodiment of the present invention, each non-intersecting 10 ms packet 76 provided by the ADC 46 is processed in accordance with the Goertzel filter described above for the selected frequency components of: 5, 800, 3800, 4000, 6100, 6200, 6300, 6700, 7200, and 8000 Hz. Of these frequencies, those at or below 1000 Hz represent a low frequency range, at or above 8000 Hz represents a high frequency range, and those between 1000 and 8000 Hz represent a middle frequency range. The Goertzel algorithm and statistical accumulator box 78 produces an output 80 comprising a tuple of eleven (11) frequency component magnitudes for each packet 76, representative of the eleven (11) selected frequency components. The output 80 is then received at a circular buffer 82 which holds the last sixteen (16) tuples of Goertzel filtered magnitudes as returned by box 78 as was the maximum observed ADC value for each 10 ms timeframe associated with each packet 76, as provided directly by the ADC 46. As such, when full the circular buffer 82 holds 16 tuple outputs 80, each representing 10 ms of values, or 160 ms worth of sampled and filtered data.

Figure 6:
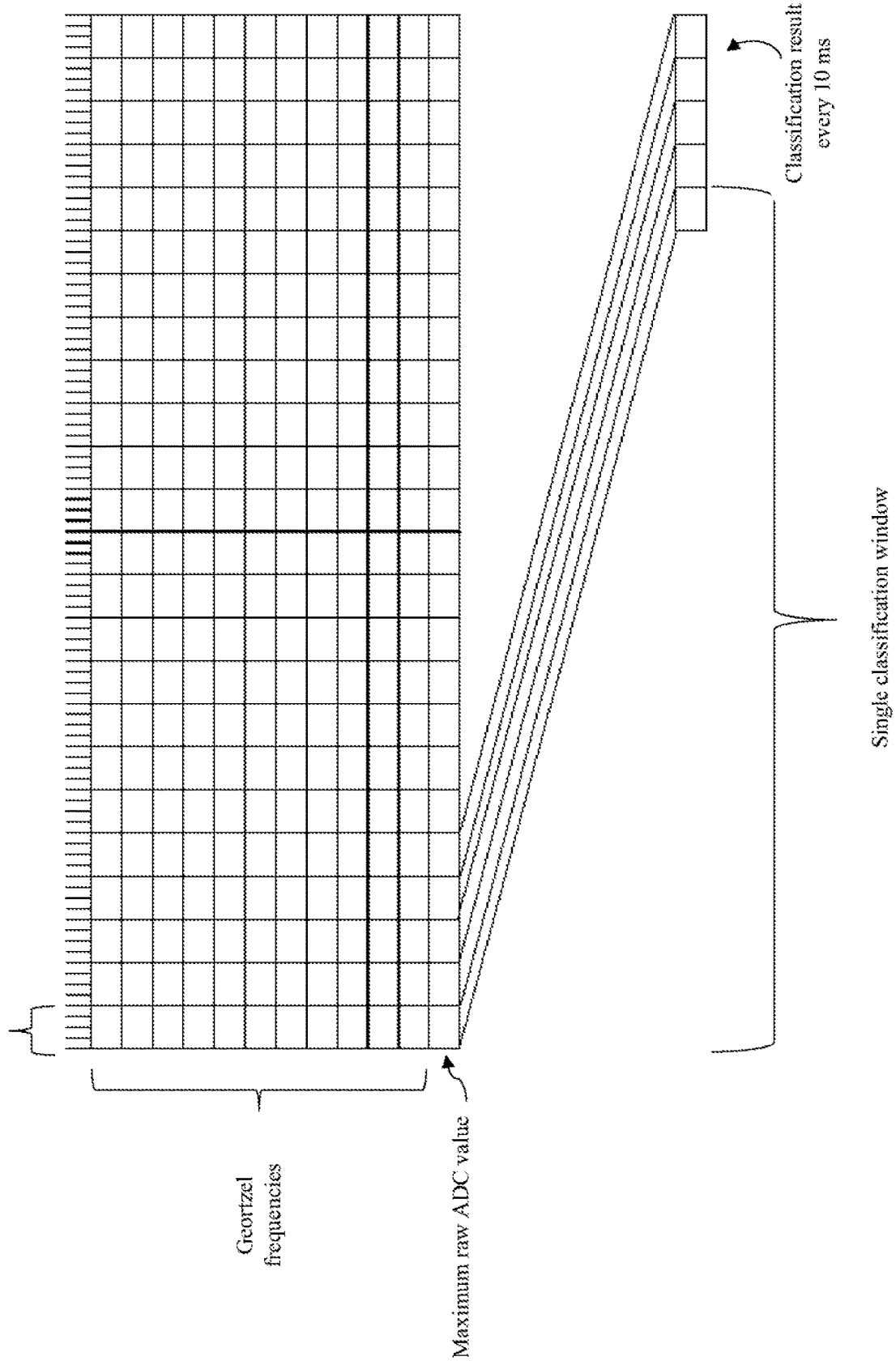
FIG. 6 is a timeline illustrating one embodiment of processing a gunshot with a sensor of the gunshot detection system of FIG. 1.
Figure 7:
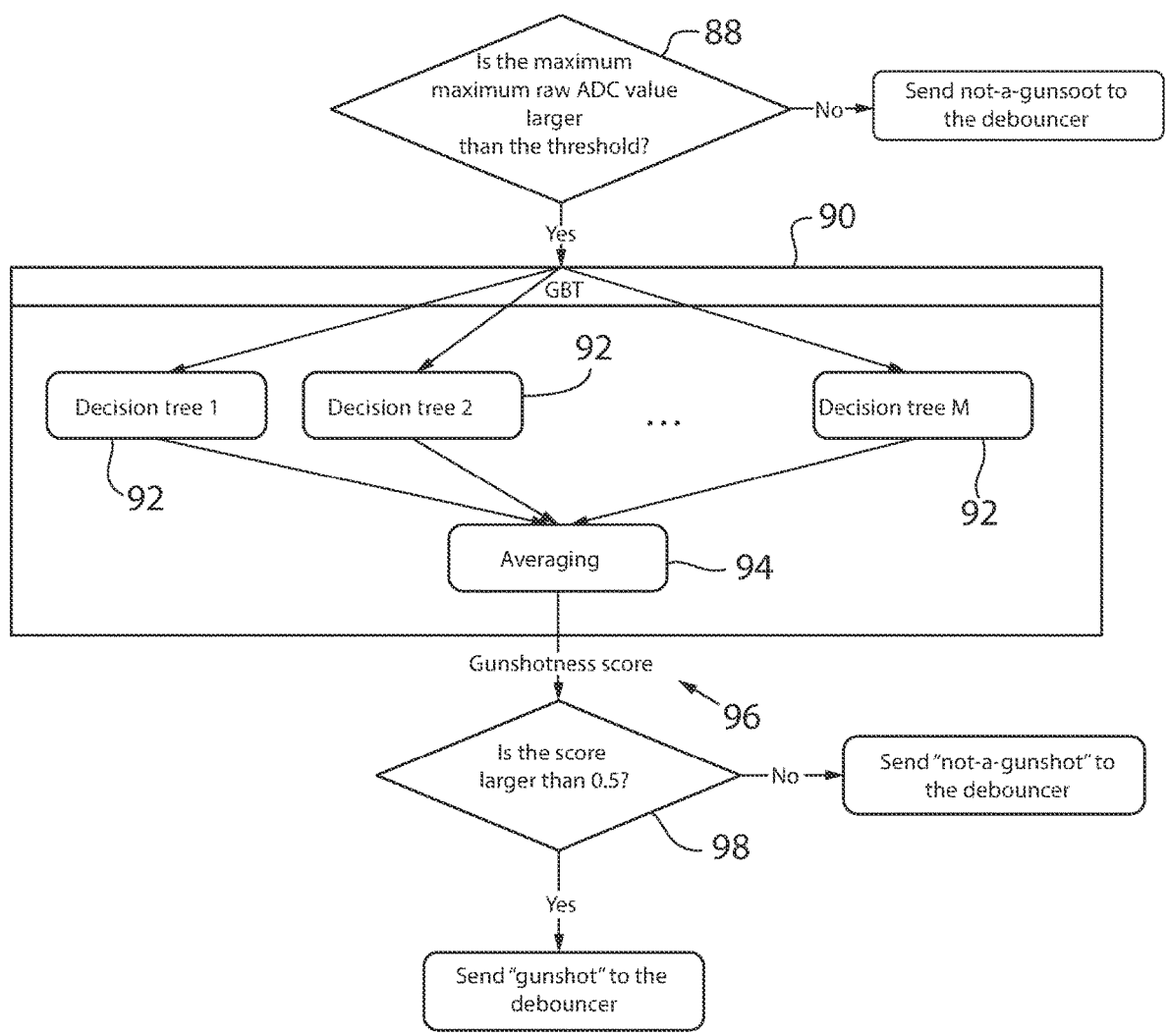
FIG. 7 is a flowchart illustrating one embodiment of classifying a sound as a gunshot with a sensor of the gunshot detection system of FIG. 1; and, FIG. 8 is a flowchart illustrating one embodiment of throttling and aggregating data during the sensing of a gunshot with a sensor of the gunshot detection system of FIG. 1.

Once the circular buffer 82 is full, it produces a buffer output 84 comprising the most recently produced 16 tuple outputs 80, each representing 10 ms of values, or a total of 160 ms worth of sampled and Goertzel filtered data and the sixteen (16) maximum observed ADC value corresponding to each 10 ms timeframe for each represented packet 76. The buffer output 84 is received at a classifier 86 which then determines if a gunshot has occurred within the 160 ms timeframe represented by the data contained within the buffer output 84, as will be described in further detail below. As shown in FIG. 6, which provides a visual representation of the timeline of analysis in the gunshot detection system 10, the classifier receives a new buffer output 84 every 10 ms, once the buffer 82 has received a new output 80 from the Goertzel filter 78. In this manner fifteen (15) of the sixteen (16) tuple outputs 80 present in the buffer output 84 will be a repeat of the prior output 84, and one (1) will be newly added every 10 ms. Furthermore, the circular buffer 82 does not begin to produce buffer outputs 84 until the buffer is full, hence there is an initial period of 160 ms during which the buffer does not produce a buffer output every 10 ms. Once the circular buffer 82 becomes full, the gunshot detection system 10 begins applying the classifier 86 every time a new tuple output 80 is obtained. At the classifier 86, if the maximum observed ADC value received from the ADC 46 for the 160 ms timeframe corresponding to the individual buffer output 84 is below a threshold value, then the buffer output is classified as a negative result, i.e., 'not a gunshot,' indicating that the acoustic waves, received at the microphone 44 from the surrounding environment was not generated by a gunshot. In one embodiment, the threshold value is between a sound pressure of between 2000 Pa and 3000 Pa, and more preferably 2600 Pa. That is to say that in one embodiment, the threshold value is between a sound pressure of between 160 dB and 163.5 dB, and more preferably on or about 162.3 dB (SPL). Alternatively, if the maximum observed ADC value received from the ADC 46 for the 160 ms timeframe corresponding to the individual buffer output 84 is equal to or exceeds that above described threshold value, then the buffer output 84 is passed onto an ensemble of decision trees, trained using gradient boosting, i.e., gradient boosted decision trees (GBT). The flowchart of FIG. 7, shows the logic overview of the classifier 86, in which the at box 88 the maximum observed ADC value received from the ADC 46 is compared to the preset threshold value, as described above. If the maximum observed ADC value meets or exceeds the threshold, the buffer output 84, comprised of the Goertzel filtered magnitudes, is passed onto the GBT 90, which comprises a plurality of decision trees 92. The results of the plurality of decision trees 92 are then averaged at box 94 to produce a gunshot output 96. At box 98, the gunshot output 96 is analyzed. If the gunshot output exceeds 0.5, i.e., the logit of the gunshot output is greater than 0, then the classified generates a positive result, i.e., 'a gunshot,' indicating that the acoustic waves, received at the microphone 44 from the surrounding environment was generated by a gunshot. Alternatively, if the gunshot output is less than 0.5, i.e., the logit of the gunshot output is not greater than 0, then the classified generates a negative result, i.e., 'not a gunshot,' indicating that the acoustic waves, received at the microphone 44 from the surrounding environment was not generated by a gunshot.

Returning not to FIG. 5, the classifier output 100, which may be either positive, indicating a gunshot, or negative, indicating no gunshot, is received at the debouncer 102. As the classifier generates a classifier output 100 every 10 ms, the results are throttled and aggregated before transmission from the sensor 12. Accordingly, the debounce 102 retains the classification output for the preceding 100 classifier outputs 100, which each correspond to 160 ms of data received from the circular buffer 82. The debouncer 102 then suppresses the transmission of duplicate gunshot alert signals being transmitted from the sensor 12. Turning now to FIG. 8, a flow chart is provided which illustrates the debouncer 102. At initial box 104 the classifier output is analyzed to determine if the corresponding 160 ms timeframe was classified as a positive or negative gunshot detection. If the classifier output 100 was classified as a negative gunshot detection, the debouncer 102 reviews the previous 10 classifier output windows 100 at box 106 to determine if a gunshot was detected in the last ten (10) classifier outputs 100, which each correspond to 160 ms. If a gunshot was detected in the last ten (10) classifier outputs, the debouncer stops sending an alert. If a gunshot was not detected in the last ten (10) classifier outputs, the debouncer 102 determiners at box 108 if there were non-gunshot alerts, i.e., sounds sufficient to trigger the system but not classified as a gunshot, in the last 100 windows. If yes, then the debouncer generates a non-gunshot alert. Alternatively, if at box 104 the classifier output 100 was classified as a positive gunshot detection, the debouncer 102 then reviews the prior two (2) classifier outputs 102 at box 110. If a gunshot was not detected in both of the prior two classifier outputs 100 then the debouncer 102 does not send an alert. If the prior two classifier outputs 100 were classified as gunshots, the debouncer 102 then determines if an alert was sent for the immediately prior classifier output 100, in box 112. If an alert was sent with the prior classifier output 100, then the debouncer 102 does not send a new alert. Alternatively, at box 114, the debouncer 102 determines if any gunshot alerts had been sent for the past ten (10) classifier outputs 100. If a gunshot alert was sent with one of the prior ten (10) classifier outputs 100, then a new alert is not sent. However, if a gunshot alert was not sent with one of the prior ten (10) classifier outputs 100, then the debouncer 102 generates a gunshot alert. The alert signal, either indicative of a gunshot alert or a non-gunshot alert, is then transmitted from the sensor 12 to the gateway 16 and/or cloud 16 via either the wired ethernet 54, 56, 58 or Wi-Fi 52 of the sensor 12.

Once the number of individual sound samples collected by the ADC 46 exceeds 19200, i.e., 1 second has passed, since a minimum observed ADC value received from the ADC 46 is below a threshold value, then the ADC will stop sampling and the sensor 12 will reenter the idle state 68. In one embodiment, the threshold for a minimum observed ADV value is between a sound pressure of between 2000 Pa and 3000 Pa, and more preferably 2600 Pa, which is to say a sound pressure of between 160 dB and 163.5 dB, and more preferably 162.28 dB (SPL).

Many other changes and modifications could be made to the invention without departing from the spirit thereof.

We claim:

1. A method for detecting the occurrence of a gunshot, comprising the steps of:
   receiving acoustic signals at a microphone indicative of a magnitude of each of the acoustic signals at a plurality of discrete frequencies;
   converting each of the acoustic signals to a digital signal;
   employing a Goertzel algorithm based digital signal filter on the digital signal to produce Goertzel magnitudes at the plurality of discrete frequencies;
   determining if a maximum value of the digital signal, generated when converting each of the acoustic signals to the digital signal, is higher than a predefined threshold value then;
   applying a gradient boosting decision tree to the Goertzel magnitudes at the plurality of discrete frequencies to predict if the Goertzel magnitudes at the plurality of discrete frequencies are indicative of a gunshot sound; and,
   transmitting a signal indicative of a gunshot occurrence after predicting if a possible gunshot event has occurred.

2. The method for detecting the occurrence of a gunshot of claim 1, wherein the plurality of discrete frequencies include at least one frequency at or below 1000 Hz, at least one frequency at or above 8000 Hz, and at least one frequency between 1000 Hz and 8000 Hz.

3. The method for detecting the occurrence of a gunshot of claim 2, wherein the plurality of discrete frequencies includes greater than 3 frequencies.

4. The method for detecting the occurrence of a gunshot of claim 3, wherein the plurality of discrete frequencies includes eleven frequencies.

5. The method for detecting the occurrence of a gunshot of claim 2, wherein the plurality of discrete frequencies are selected from a group of frequency consisting of: 5, 800, 3800, 4000, 6100, 6200, 6300, 6700, 7200, and 8000 Hz.

6. The method for detecting the occurrence of a gunshot of claim 1, wherein the step of converting the acoustic signals to a digital signal further comprises forming a series of digital signal packets for transmission to the Goertzel algorithm based digital signal filter, where each digital signal packet defines a sample duration of 10 milliseconds.

7. The method for detecting the occurrence of a gunshot of claim 6, wherein the Goertzel algorithm based digital signal filter produces a tuple of Goertzel magnitudes corresponding to eleven discrete frequencies for each digital signal packet.

8. The method for detecting the occurrence of a gunshot of claim 7, further comprising the step of retaining a series of ten preceding tuples of Goertzel magnitudes in a circular buffer after the tuples are produced at the Goertzel algorithm based digital signal filter.

9. The method for detecting the occurrence of a gunshot of claim 8, wherein the circular buffer further retains the maximum value of the digital signal for the sample duration of 10 milliseconds corresponding to each digital signal packet.

10. The method for detecting the occurrence of a gunshot of claim 9, wherein the predefined threshold value is between 160 dB and 163.5 dB.

11. The method for detecting the occurrence of a gunshot of claim 10, further comprising transmitting the series of ten preceding tuples of Goertzel magnitudes from the circular buffer to the gradient boosting decision tree in the event that the maximum value of the digital signal is higher than the predefined threshold value of between 160 dB and 163.5 dB.

12. The method for detecting the occurrence of a gunshot of claim 11, wherein the step of predicting if the Goertzel magnitudes at the plurality of discrete frequencies are indicative of a gunshot sound at the gradient boosting decision tree generates either a negative or positive output.

13. The method for detecting the occurrence of a gunshot of claim 12, further comprising the steps of receiving the positive output at a debouncer and generating a signal indicative of a gunshot occurrence while suppressing duplicative signals.

14. A gunshot detection system, comprising
at least one sensor, the sensor comprising
a microphone receiving acoustic signals,
a signal converter for converting each of the acoustic signals to a digital signal,
a processor configured to employ a Goertzel algorithm based digital signal filter on the digital signal to produce Goertzel magnitudes at a plurality of discrete frequencies for each digital signal and upon determining that a maximum value of the digital signal, that is generated when converting each of the acoustic signals to the digital signal, is higher than a predefined threshold value then applying a gradient boosting decision tree to the Goertzel magnitudes at the plurality of discrete frequencies to predict if the Goertzel magnitudes at the plurality of discrete frequencies are indicative of a gunshot sound; and,
upon predicting that the Goertzel magnitudes at the plurality of discrete frequencies are indicative of a gunshot sound then transmitting a signal indicative of a gunshot occurrence from the sensor to a trigger component;
the trigger component having transceiver configured to receive the signal indicative of the gunshot occurrence and generate an alarm.

15. The gunshot detection system of claim 14, wherein the plurality of discrete frequencies include at least one frequency at or below 1000 Hz, at least one frequency at or above 8000 Hz, and at least one frequency between 1000 Hz and 8000 Hz.

16. The gunshot detection system of claim 15, wherein the signal converter forms a series of digital signal packets for transmission to the Goertzel algorithm based digital signal filter, where each digital signal packet defines a sample duration of 10 milliseconds.

17. The gunshot detection system of claim 16, wherein the Goertzel algorithm based digital signal filter produces a tuple of Goertzel magnitudes corresponding to each of the plurality of discrete frequencies for each digital signal packet.

18. The gunshot detection system of claim 17, further comprising a circular buffer retaining a series of ten preceding tuples of Goertzel magnitudes after the tuples are produced at the Goertzel algorithm based digital signal filter.

19. The gunshot detection system of claim 18, further comprising a classifier subjecting 10 preceding tuples of Goertzel magnitudes, received from the circular buffer, to the gradient boosting decision tree in the event that the maximum value of the digital signal over the same sample duration of 10 milliseconds is higher than the predefined threshold value of between 160 dB and 163.5 dB.

20. The gunshot detection system of claim 19, further comprising a debouncer configured to generate a signal indicative of a gunshot occurrence while suppressing duplicative signals upon receipt of a classifier output indicative of a gunshot generating the acoustic signals received at the microphone during the same sample duration of 10 milliseconds.

* * * * *